(12) United States Patent
Liu et al.

(10) Patent No.: US 7,277,685 B2
(45) Date of Patent: Oct. 2, 2007

(54) AUTOMATIC GAIN CONTROL OF MULTIPLE ANTENNA OFDM RECEIVER

(75) Inventors: Der-Zheng Liu, Tai-Nan (TW); Shan-An Yang, Chang-Hua Hsien (TW); Kuang-Yu Yen, Tai-Chung (TW)

(73) Assignee: Realtek Semiconductor Corp., HsinChu (TW)

( * ) Notice: Subject to any disclaimer, the term of this patent is extended or adjusted under 35 U.S.C. 154(b) by 350 days.

(21) Appl. No.: 10/605,563

(22) Filed: Oct. 9, 2003

(65) Prior Publication Data

US 2004/0209582 A1  Oct. 21, 2004

Related U.S. Application Data

(63) Continuation-in-part of application No. 10/249,557, filed on Apr. 17, 2003.

(51) Int. Cl.
*H04B 7/00* (2006.01)

(52) U.S. Cl. ............... 455/240.1; 455/136; 455/250.1; 375/345

(58) Field of Classification Search .............. 375/345; 455/232.1, 234.1, 240.1, 245.1, 250.1, 132, 455/133, 136, 138, 239.1
See application file for complete search history.

(56) References Cited

U.S. PATENT DOCUMENTS

| | | | |
|---|---|---|---|
| 5,457,811 A * | 10/1995 | Lemson | 455/67.11 |
| 5,831,456 A * | 11/1998 | Sutardja | 327/100 |
| 6,097,755 A * | 8/2000 | Guenther et al. | 375/228 |
| 6,141,393 A | 10/2000 | Thomas et al. | |
| 6,363,127 B1 | 3/2002 | Heinonen | |
| 6,473,393 B1 | 10/2002 | Ariyavisitakul | |
| 6,480,528 B1 * | 11/2002 | Patel et al. | 375/148 |
| 6,574,292 B2 | 6/2003 | Heinonen | |
| 6,862,440 B2 | 3/2005 | Sampath | |
| 6,996,195 B2 | 2/2006 | Kadous | |
| 2002/0090042 A1 | 7/2002 | Heinonen | |
| 2002/0181549 A1 | 12/2002 | Linnartz et al. | |
| 2003/0045250 A1 * | 3/2003 | Haapoja | 455/126 |
| 2003/0112882 A1 | 6/2003 | Sampath | |
| 2004/0005010 A1 | 1/2004 | Me et al. | |
| 2004/0120422 A1 * | 6/2004 | Lin et al. | 375/316 |
| 2004/0146091 A1 * | 7/2004 | Chang et al. | 375/147 |
| 2004/0204098 A1 * | 10/2004 | Owen | 455/561 |

* cited by examiner

*Primary Examiner*—Edward F. Urban
*Assistant Examiner*—Nhan T. Le
(74) *Attorney, Agent, or Firm*—Winston Hsu

(57) ABSTRACT

A method includes amplifying the plurality of received signals, generating a plurality of time domain samples of the amplified signals with at least an analog-to-digital converter (ADC), determining at least a candidate power according to root-mean-square (RMS) powers of a first group of symbols received at the receiver antennas, and setting the gain of the amplifier according to a selected candidate power with the processor. The received RMS power for one antenna is determined as the square root of the averaged product of each received symbol and its complex conjugate for all symbols of the first group. The candidate power can be determined considering a subgroup of antennas using an RMS value, an arithmetical mean value, or a geometric mean value of this subgroup.

26 Claims, 12 Drawing Sheets

AUTOMATIC GAIN CONTROL OF MULTIPLE ANTENNA OFDM RECEIVER

CROSS REFERENCE TO RELATED APPLICATIONS

This is a continuation-in-part of application Ser. No. 10/249,557, filed Apr. 17, 2003, which is included in its entirety herein by reference.

BACKGROUND OF INVENTION

1. Field of the Invention

The present invention relates to a wireless communication system, and more specifically, to automatic gain control in a receiver of a multiple-antenna system.

2. Description of the Prior Art

Wireless local area networks (WLANs) are ever increasingly being used in network environments where mobility is of importance. Orthogonal frequency division multiplexing (OFDM) is a well-known concept used in implementing WLAN system. A typical WLAN employing OFDM can achieve a maximum data transfer rate of 54 Mbps per client, which is significantly less than the wire-based LAN capability of between 100 Mbps to 10 Gbps. This 54 Mbps transfer limit for WLANs is a consequence of current technological limitations and regulation, such as that according to IEEE 802.11a or 802.11g for example. For conventional WLANs, the advantage of mobility can be enhanced by an improvement in data rate.

FIG. 1 illustrates a convention WLAN 10 including an access point 12, a first user terminal 14, and a second user terminal 16. The WLAN 10 is very much typical of an IEEE 802.11a or 802.11g implementation. The access point 12 includes four antennas (or antenna pairs) for communicating data with the terminals 14, 16, the first user terminal 14 having a single antenna and the second user terminal 16 having two antennas. In the access point 12, a single antenna is used to communicate with the first user terminal 14, and two antennas are used to communicate with the second user terminal 16 over three frequency bands in total.

FIG. 2 illustrates the frequency band assignment of the WLAN 10 of FIG. 1. As each antenna operates in a distinct frequency band, the first user terminal 14 uses a first frequency band, while the second user terminal 16 uses second and third frequency bands. Thus, in accordance with the above-mentioned 54 Mbps transfer rate limitation, the first user terminal 14 and second user terminal 16 have maximum data rates of 54 Mbps and 108 Mbps respectively. Increasing these data rates can only be facilitated by increasing the number of antennas in the user terminals 14, 16 and consequently increasing the number of available frequency bands. In addition, if the WLAN 10 has only three frequency bands available for use, the access point 12 is encumbered with an extra antenna that cannot be used to communicate with another user terminal.

Frequency band assignments for WLANs are set forth in IEEE standards 802.11a and 802.11g, for example. According to IEEE Std 802.11a—1999, the 5 Ghz band comprises 12 frequency bands for data communication. Similarly, the 2.4 Ghz band of IEEE 802.11g offers three frequency bands. Following these specifications, prior art implementations have been constrained to one band per antenna and the resulting 54 Mbps maximum data rate per band.

Automatic gain control of receiver amplifiers in the prior art system of FIG. 1 can be performed with the methods and circuitry disclosed in U.S. Pat. Nos. 6,363,127 and 6,574,292, which are included herein by reference. However, the prior art does not teach automatic gain control in an OFDM receiver having multiple antennas and corresponding data paths for a single frequency band.

SUMMARY OF INVENTION

It is therefore a primary objective of the claimed invention to provide a method for automatic gain control (AGC) in an orthogonal frequency division multiplexing (OFDM) receiver having receiver antennas that receive signals via a single frequency band.

Briefly summarized, the claimed invention method includes amplifying the plurality of received signals, generating a plurality of time domain samples of the amplified signals with at least an analog-to-digital converter (ADC), determining at least a candidate power according to root-mean-square (RMS) powers of a first group of symbols received at the receiver antennas, and setting the gain of the amplifier according to a selected candidate power with the processor.

According to the claimed invention, the received RMS power for one antenna is determined as the square root of: the product of a real part and a complex part of each received symbol averaged for all symbols of the first group.

According to the claimed invention, candidate powers for a second group of antennas can be: an RMS value of the RMS powers for each antenna, an average of the RMS powers for each antenna, or a geometric mean of the RMS powers for each antenna. Further, the second group can be: all receiver antennas, receiver antennas having RMS powers greater than a first threshold, receiver antennas having RMS powers less than a second threshold, or receiver antennas having RMS powers within a predetermined range spanning a mode of RMS powers of all antennas.

It is an advantage of the claimed invention that the candidate power is determined according to the RMS power of the first group of symbols.

It is a further advantage of the claimed invention that the candidate power can be further determined according to a plurality of methods, with the most suitable candidate power being used to set the gain of the amplifier.

These and other objectives of the claimed invention will no doubt become obvious to those of ordinary skill in the art after reading the following detailed description of the preferred embodiment that is illustrated in the various figures and drawings.

DETAILED DESCRIPTION

Figure 3:
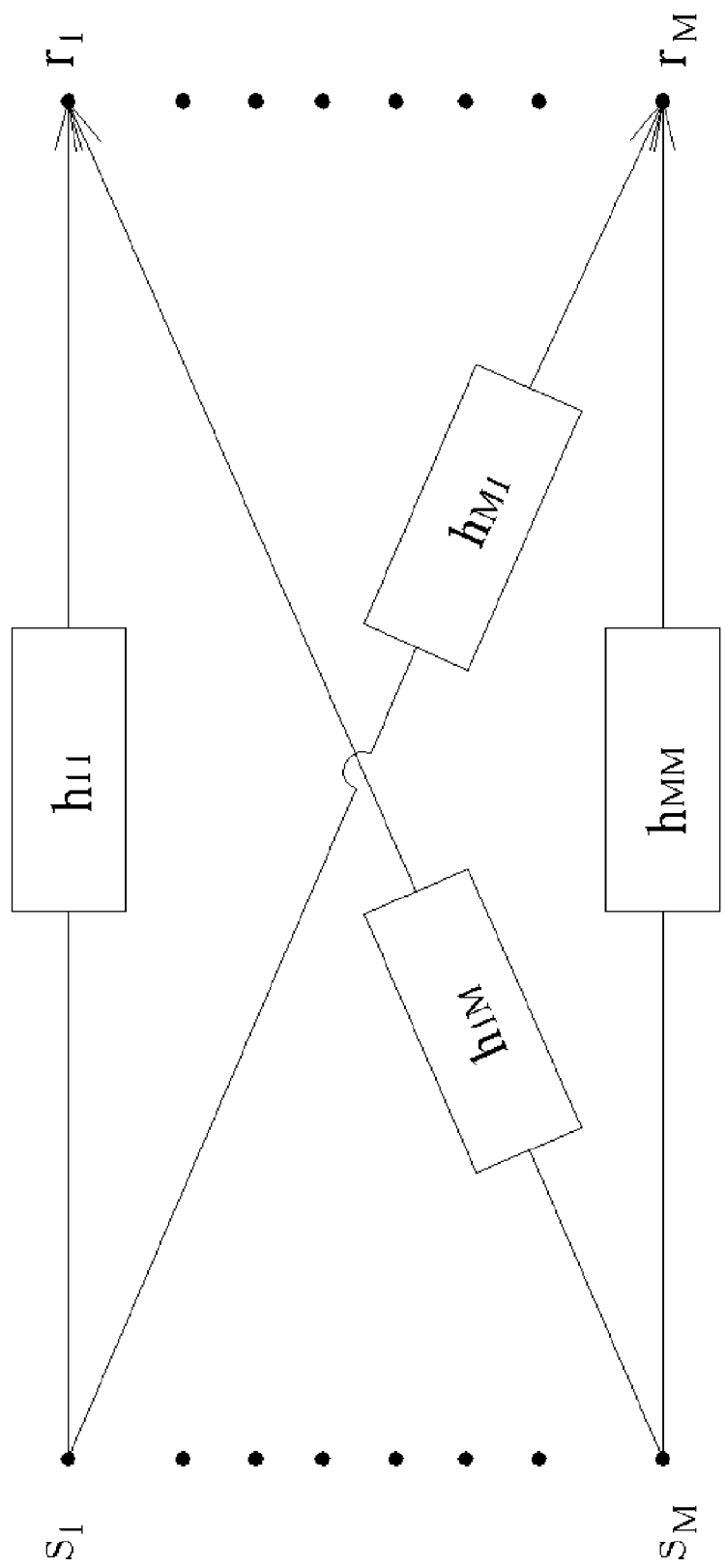
FIG. 3 is a schematic diagram of signal transmission between multiple transmitter and receiver antennas.

General Configuration:

Please refer to FIG. 3, which is a schematic diagram illustrating signal transmission and reception in a multiple transmitter/receiver antenna application. When a group of signals $s_1$-$s_M$ is transmitted along the pathways, $h_{11}$ etc, shown, they are substantially simultaneously received as signals $r_1$-$r_M$ after undergoing inter-antenna interference. Generally, for M transmitters and receivers, such transmission and interference can be described by the channel impulse response matrix as follows:

$$h = \begin{bmatrix} h_{11} & h_{12} & \cdots & h_{1M} \\ h_{21} & h_{22} & \cdots & h_{2M} \\ \vdots & \vdots & \ddots & \vdots \\ h_{M1} & h_{M2} & \cdots & h_{MM} \end{bmatrix}, \quad (1)$$

where h is a channel impulse response, and

M is a total number of antennas in the transceiver.

The digits of the index of each channel impulse response value, h, respectively indicate the receiver and transmitter antennas defining such channel. For example, the channel impulse response value $h_{12}$ corresponds to the channel from a second transmitter antenna to a first receiver antenna. The channel impulse response matrix (1) relates transmitted and received signals as follows:

$$r = h * s + n, \quad (2)$$

where r is a vector comprising the received signals $[r_1 \, r_2 \ldots r_M]^T$, s is a vector comprising the transmitted signals $[s_1 \, s_2 \ldots s_M]^T$, * is the convolution calculation, and n is a vector comprising noise affecting each receiver $[n_1 \, n_2 \ldots n_M]^T$, which can be neglected.

The matrix (1) and relation (2) apply to orthogonal frequency division multiplexing (OFDM) wireless local area network (WLAN) system. In the following description, the present invention provides a receiver and a method that effectively estimate the channel impulse response matrix (1) by way of an example of an OFDM WLAN receiver according to the IEEE 802.11a or 802.11g standards. It should be noted that in this description and in the figures, capital letter notation refers to the frequency domain, while lower case letter notation refers to the time domain, as is well know in the art.

Figure 4:
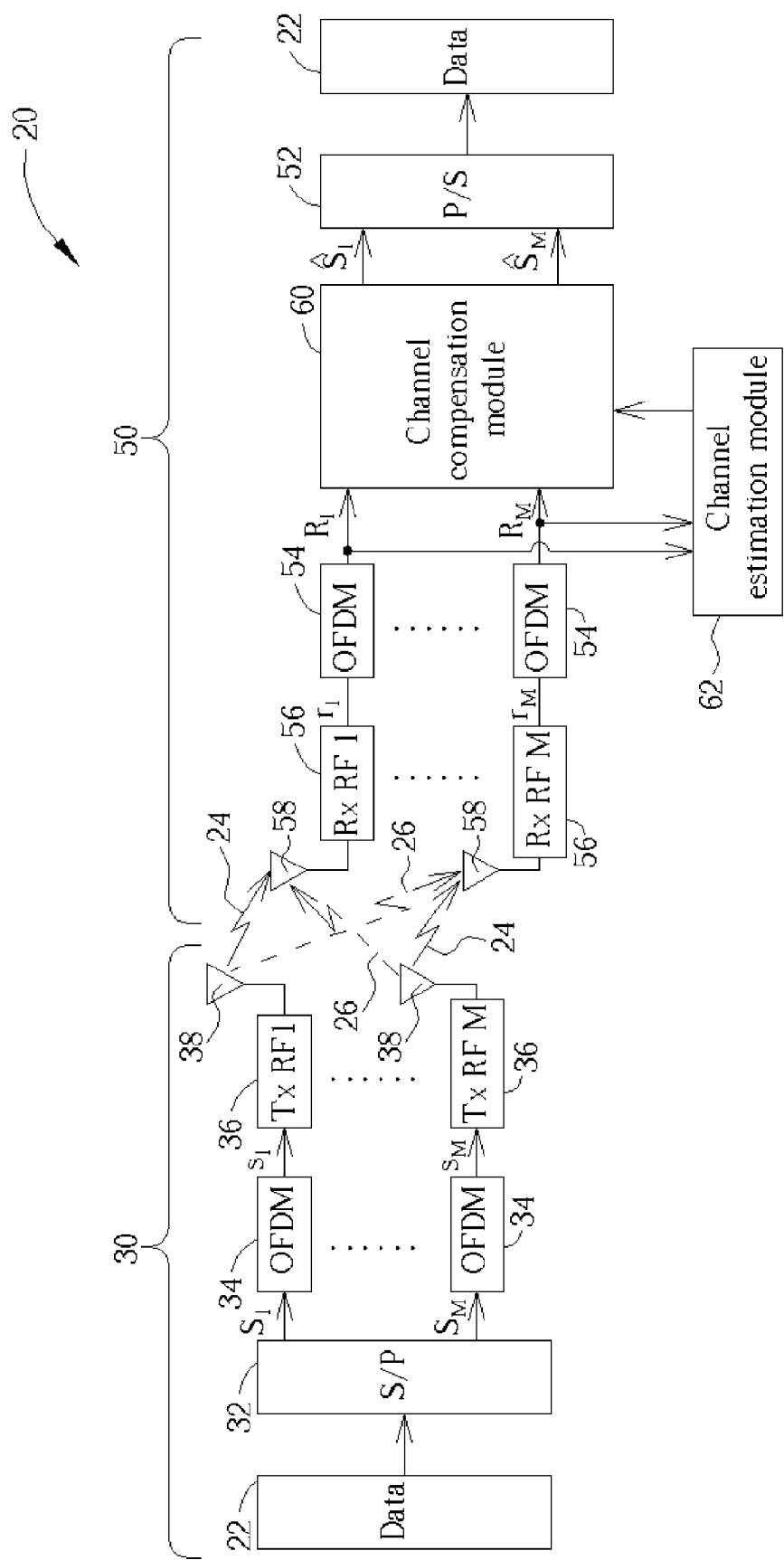
FIG. 4 is a block diagram of a communication system according to the present invention.

Referring to FIG. 4, a communication system 20 according to the present invention is illustrated. The communication system 20 comprises a transmitter 30 and a receiver 50 capable of operating on a single frequency band. The transmitter 30 accepts data 22 for transmission at a serial to parallel interface 32. The serial to parallel interface 32 is connected to a plurality of OFDM modules each comprising an OFDM transmitter 34, transmitter RF module 36, and a transmitter antenna 38 adapted to transmit RF signals. The transmitter 30 is capable of processing the data 22 and transmitting corresponding signals by each antenna 38 to the receiver 50, as shown in FIG. 4 by lines indicating intended RF data transmissions 24 and inter-antenna interference 26. The receiver 50 includes a plurality of OFDM modules each comprising a receiver antenna 58, receiver RF module 56, and an OFDM receiver 54. The OFDM receivers 54 are adapted to output signals to a connected channel compensation module 60 and channel estimation module 62. The channel compensation module 60 is connected to a parallel to serial interface 52 that outputs the transmission data 22. The channel compensation and estimation module 60, 62 work in conjunction to eliminate the effects of inter-antenna interference 26 such that the data 22 can be accurately received at the receiver 50.

As established by the OFDM receivers 54, the channel compensation and estimation modules 60, 62 operate in a frequency domain. In the frequency domain portions of the communication system 20, matrix (1) becomes a channel frequency response matrix as follows:

$$H_i = \begin{bmatrix} H_{11,i} & H_{12,i} & \cdots & h_{1M,i} \\ H_{21,i} & H_{22,i} & \cdots & h_{2M,i} \\ \vdots & \vdots & \ddots & \vdots \\ H_{M1,i} & H_{M2,i} & \cdots & h_{MM,i} \end{bmatrix}, \quad (3)$$

where the digits of the first index of each channel frequency response value H respectively indicate the receiver and transmitter antennas 56, 36 defining such channel, M being the total number of antennas defined. For example, the channel frequency response value $H_{12}$ corresponds to a first receiver antenna 56 and a second transmitter antenna 36. The channel frequency response matrix (3) relates transmitted and received signals as follows:

$$R_{n,k} = H_k \cdot S_{n,k} + N_{n,k}, \quad (4)$$

where

R is a vector comprising the received signals $[R_{1,n,k} \, R_{2,n,k} \ldots R_{M,n,k}]^T$, S is a vector comprising the transmitted signals $[S_{1,n,k} \, S_{2,n,k} \ldots S_{M,n,k}]^T$, N is a vector comprising noise affecting each channel $[N_{1,n,k} \, N_{2,n,k} \ldots N_{M,n,k}]^T$, and can be neglected, n is an index of an OFDM symbol, and k is an index of a sub-channel.

Regarding equation (4), OFDM symbols are received over time by the OFDM receivers 54 of the receiver 50 and are accordingly indexed as n. That is, each OFDM symbol is assigned an index n based on its relative position in time. Moreover, although the receiver 50 operates in a single frequency band, the OFDM receivers 54 allow for multiple sub-channels as indexed by k. The transmitter 30 and receiver 50 of FIG. 4 are bound by the equation (4), with the channel estimation module 62 estimating the channel frequency response matrix (3) and the channel compensation module 60 applying the estimated channel frequency response to facilitate exact communication of the data 22.

The channel estimation module 62 generates an estimate of the channel frequency response matrix (3) by performing a calibration comparing known original transmission signals with signals received at the receiver 50. That is, known calibration signals are transmitted separately or as part of a data transmission, with the received versions of these calibration signals being compared to the originals to determine what compensation must be applied to the data signals. For each sub-channel, k, an inversable calibration matrix is defined as follows:

$$P_i = \begin{bmatrix} P_{1,1,i} & P_{1,2,i} & \cdots & P_{1,M,i} \\ P_{2,1,i} & P_{2,2,i} & \cdots & P_{2,M,i} \\ \vdots & \vdots & \ddots & \vdots \\ P_{M,1,i} & P_{M,2,i} & \cdots & P_{M,M,i} \end{bmatrix}, \quad (5)$$

referencing a long preamble symbol $L_k$, such as that defined in the IEEE 802.11a or 802.11g standards, and an inversable linear combination matrix such as:

$$c = \begin{bmatrix} 1 & 0 & \cdots & 0 \\ 0 & 1 & \cdots & 0 \\ \vdots & \vdots & \ddots & \vdots \\ 0 & 0 & \cdots & 1 \end{bmatrix}, \text{ where } c^{-1} = c, \quad (6)$$

$$c = \begin{bmatrix} 1 & 1 & \cdots & 1 \\ 1 & \omega & \cdots & \omega^{M-1} \\ \vdots & \vdots & \ddots & \vdots \\ 1 & \omega^{M-1} & \cdots & \omega^{(M-1)^2} \end{bmatrix}, \quad (7)$$

$$\text{where } c^{-1} = \frac{1}{M} \begin{bmatrix} 1 & 1 & \cdots & 1 \\ 1 & \omega^{-1} & \cdots & \omega^{-(M-1)} \\ \vdots & \vdots & \ddots & \vdots \\ 1 & \omega^{-(M-1)} & \cdots & \omega^{-(M-1)^2} \end{bmatrix}$$

and $\omega$ is the root of $1+\omega+\ldots+\omega^{M-1}=0$, or $$c = C_M = \begin{bmatrix} C_{M/2} & C_{M/2} \\ C_{M/2} & -C_{M/2} \end{bmatrix}, \text{ where } c^{-1} = \frac{1}{M} C_M, \quad (8)$$

$C_1=1$, and M is multiple of 2.

The calibration matrix (5) is related to the long preamble symbol and an inversable linear combination matrix (6), (7), or (8), for example, by:

$$P_k = L_k \cdot c \quad (9)$$

where $L_k$ is the long preamble symbol.

Note that the indices of the calibration matrix (5) receiver antenna number, OFDM symbol number n, and sub-channel k. Any calibration data can be used provided that it forms an inversable matrix, the above inversable linear combination matrices (6), (7), or (8) being given as examples. Furthermore, it is advantageous to select the calibration data such that the calibration matrix (5) has fewer unique elements than transmitter-receiver antenna combinations, $M^2$, so as to reduce hardware complexity and cost.

The channel estimation module 62 calculates the estimate of the channel frequency response according to the following:

$$\hat{H}_k = \Psi_k \cdot P_k^{-1}, \quad (10)$$

where $\hat{H}_k$ is an estimate of the channel frequency response matrix H (3) for a sub-channel k, and $\Psi_k$ is the calibration data $P_k$ as received at the receiver 50 affected by inter-antenna interference.

From equation (10) it can be seen that if there is no inter-antenna interference 26 in the communication system 20, the transmitted calibration data $\Psi_k$ is equal to the reference calibration data $P_k$, and the estimate of the channel frequency response matrix $\hat{H}_k$ becomes the identity matrix. In this special case, equation (4) illustrates that the received signals are exactly the transmitted signals (neglecting noise). In a practical case, where inter-antenna interference 26 exists, the channel estimation module 62 provides a suitable estimate of the frequency responses according to the aforementioned calibration and equation (10).

Once the channel estimation module 62 determines a suitable estimate for the channel frequency response according to equation (10), the channel compensation module 60 effects the estimate such that:

$$\hat{S}_{n,k} = \hat{H}_k^{-1} \cdot R_{n,k}, \quad (11)$$

where $\hat{S}_k$ is a vector comprising an estimate of the originally transmitted signals, and ideally equal to S of equation (4).

Figure 5:
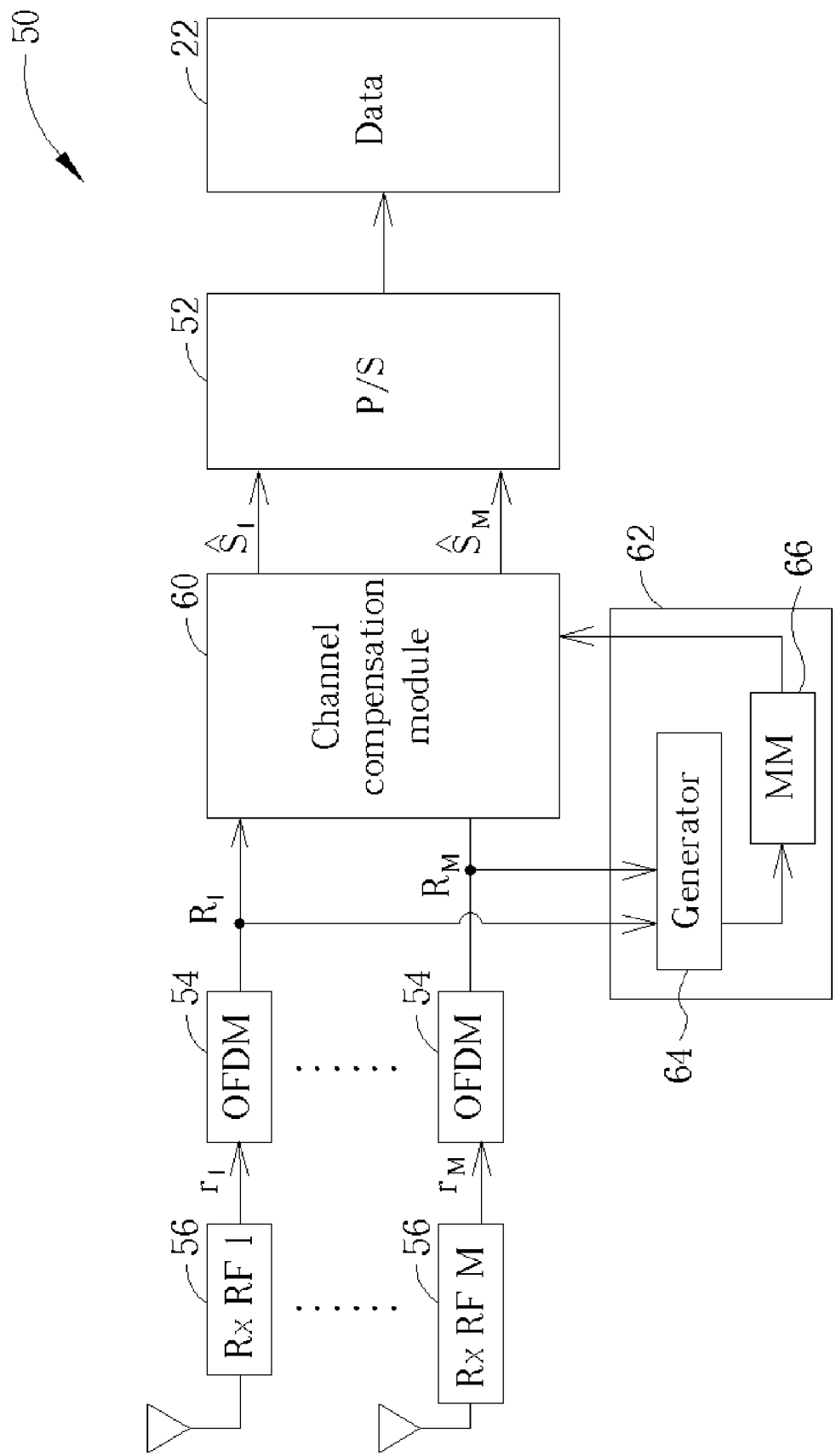
FIG. 5 is a block diagram of the receiver of FIG. 4.

Referencing FIG. 4 and FIG. 5 and equations (5) through (10), operation of the present invention communication system 20 will now we described in detail. The data 22 to be transmitted is configured such that a portion of it comprises predetermined calibration data as the inversable calibration matrix $P_k$ (5), (9). This can be arranged in several ways, which will be discussed further. The transmitter 30 configures the data 22 as OFDM signals and then transmits these signals 24 via antennas 38 over a single frequency band. Each receiver antenna 58 receives the transmitted signals, which have been affected by inter-antenna interference 26, and forwards them to the channel estimation module 62. The channel estimation module 62 extracts the received calibration data $\Psi_k$ and compares it with the original calibration data $P_k$. In a preferred embodiment of the receiver 50 as shown in FIG. 5, a generator 64 of the estimation module 62 extracts the received calibration data $\Psi_k$, and a matrix multiplier 66 multiplies the received calibration data $\Psi_k$ with the inversed original calibration matrix $P_k$ to determine the estimation of the channel frequency response matrix $\hat{H}_k$, equation (10). If required by specific applications, the channel estimation module 62 can include further matrix manipulation elements such as a matrix inverter. Finally, the estimation module 62 forwards the estimated channel frequency response matrix $\hat{H}_k$ to the channel compensation module 60, which applies the estimate to the received signals $R_k$ to output the estimate of the transmitted signals $\hat{S}_k$ as in equation (11). Note that either the channel estimation module 62 or the channel compensation module 60 inverses the channel frequency response matrix $\hat{H}_k$. In practical application under correct operating conditions, the estimated signals $\hat{S}_k$ will be equivalent to the originally transmitted signals $S_k$.

In an alternative embodiment, an inverse of the channel frequency response matrix is applied such that equations (10) and (11) become:

$$\hat{Q}_k = \Psi_k^{-1} P_k, \quad (10)$$

$$\hat{S}_{n,k} = \hat{Q}_k \cdot R_{n,k}, \quad (11)$$

where $\hat{Q}_k$ is the inverse of the estimated channel frequency response matrix $\hat{H}_k$ (3).

In this alternative embodiment, inversion of the estimated channel frequency response matrix (3) is not required as in equation (11), however, the received calibration data matrix $\square_k$ must be inverted instead. This alternative embodiment has advantages in specific implementations of the present invention.

Figure 6:
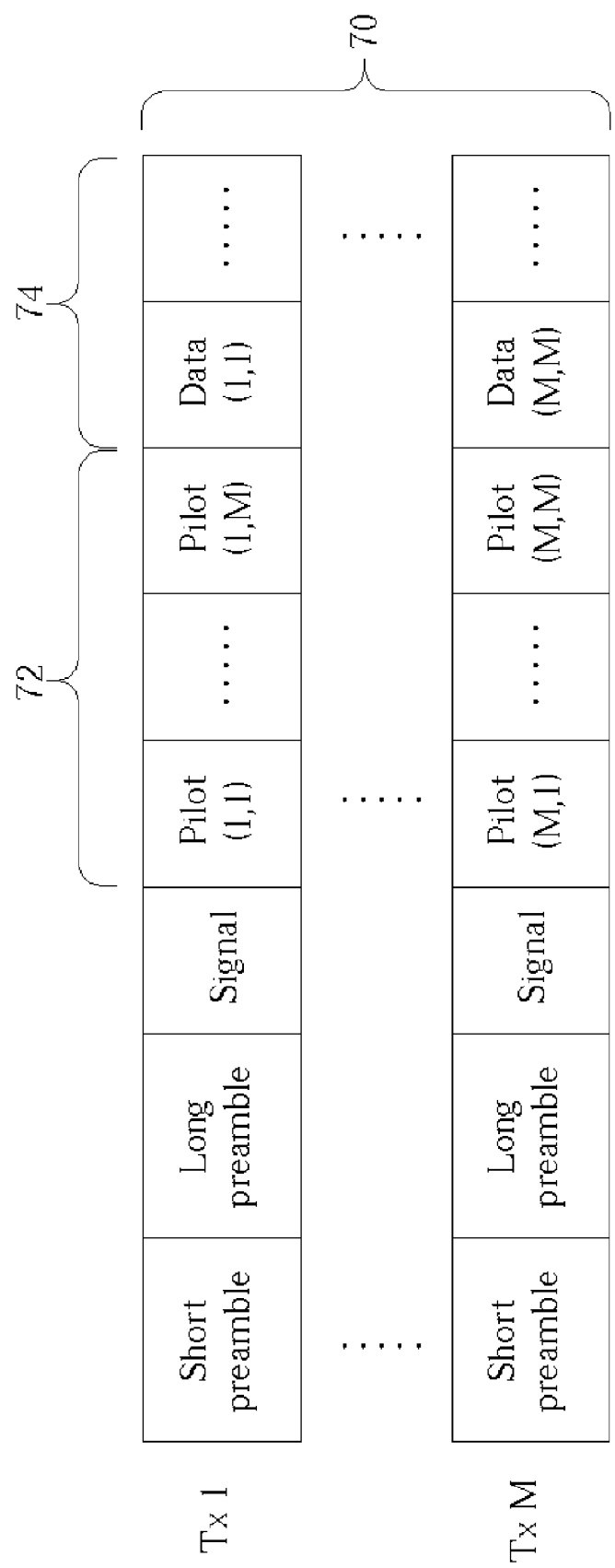
FIG. 6 is a block diagram of signals transmitted in the communication system of FIG. 4.

Referring to FIG. 6, signals 70 of the communication system 20 according to an IEEE 802.11a or 802.11g format are illustrated. Pilot segments 72 of these signals 70 are used to carry the calibration data of the matrix (5), and data segments 47 are arranged after the pilot segments 72 for transmitting user data. The compositions of the pilot segments 72 and the data segments 74 are varied according to the associated transmitter. Such a signal configuration serves as an example, and naturally, others are suitable as well.

Figure 1:
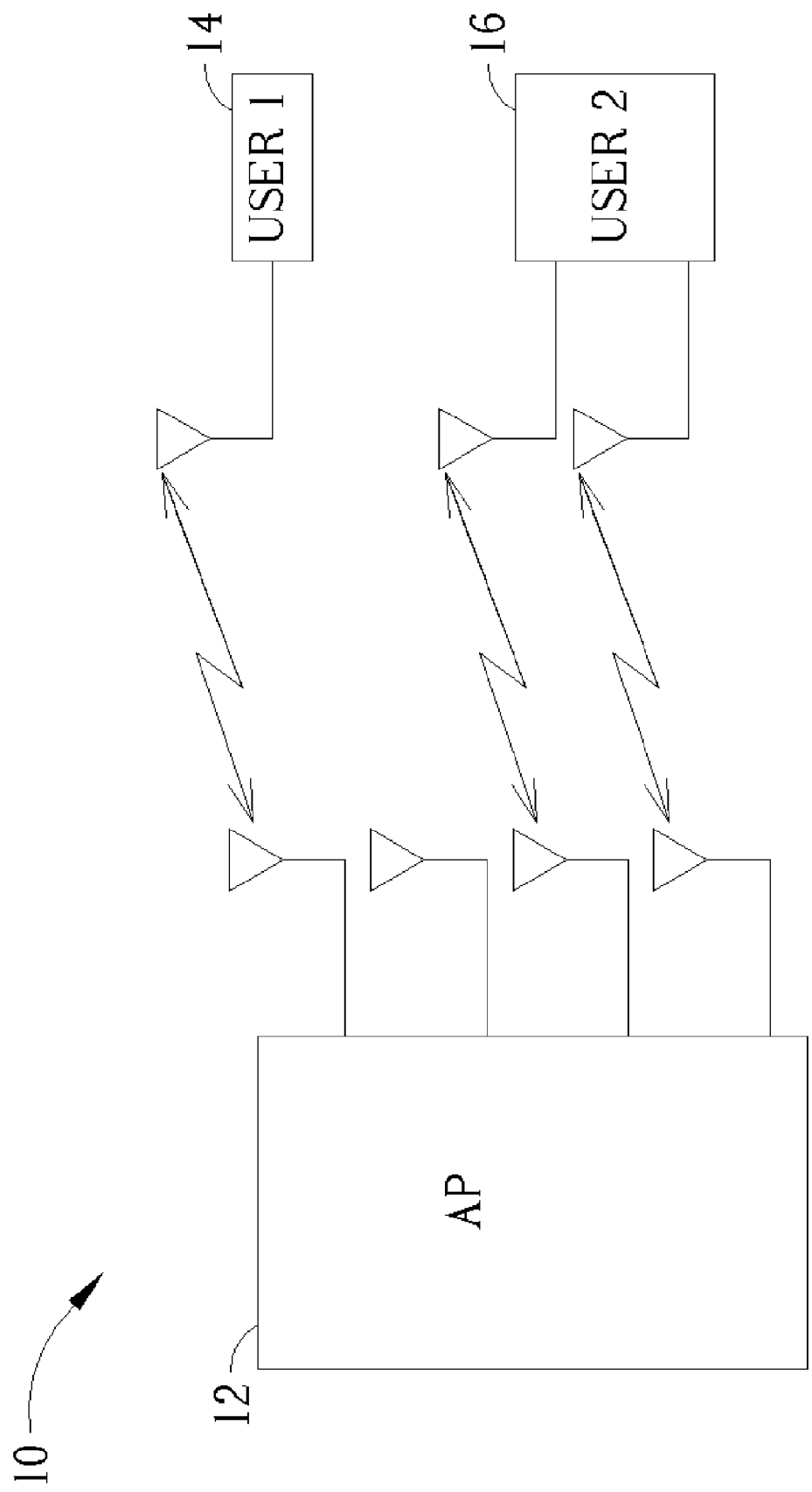
FIG. 1 is a block diagram of a prior art WLAN.
Figure 2:
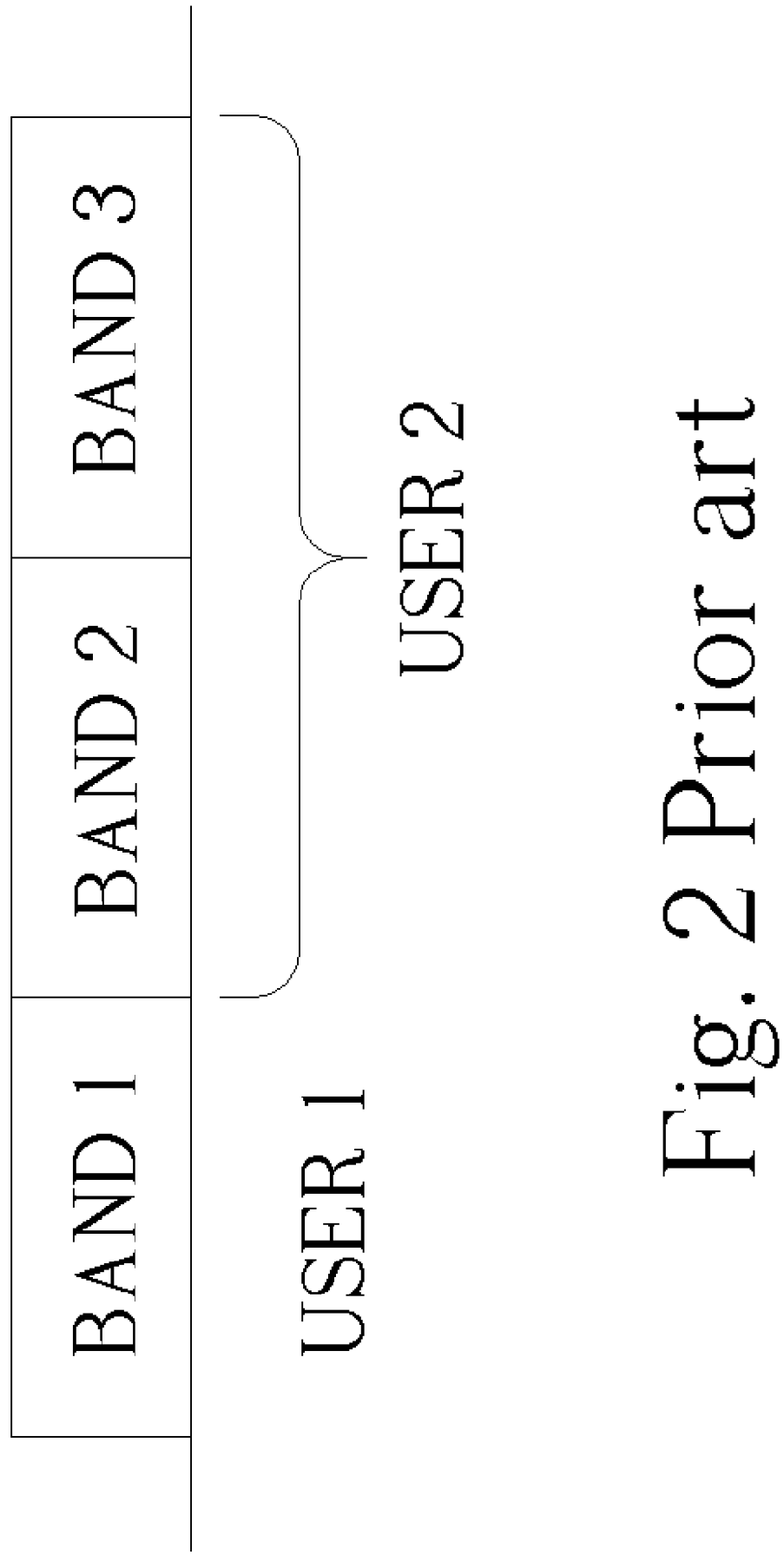
FIG. 2 is a schematic diagram of frequency band use in the WLAN of FIG. 1.
Figure 7:
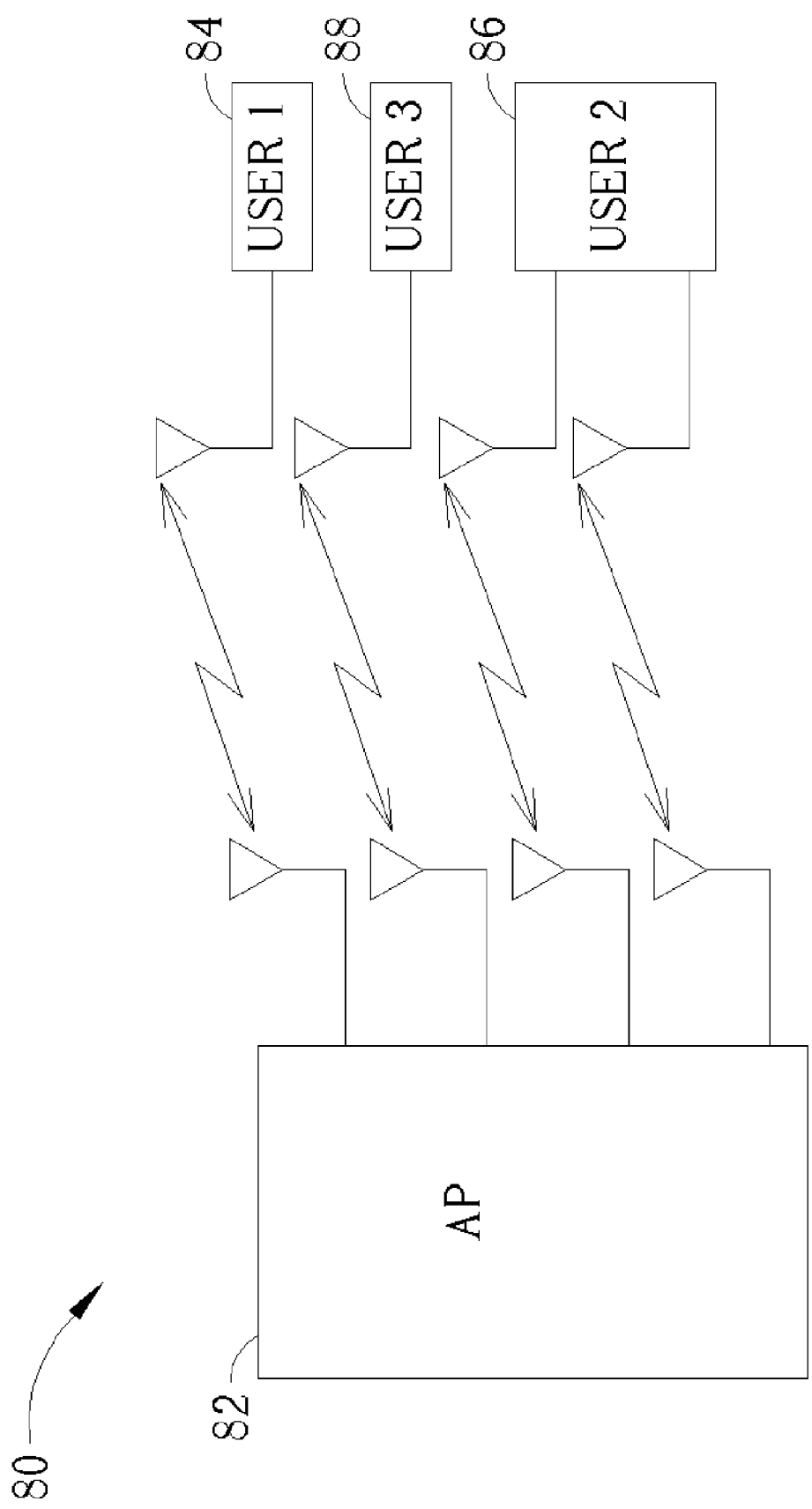
FIG. 7 is a block diagram of a WLAN according to the present invention.
Figure 8:
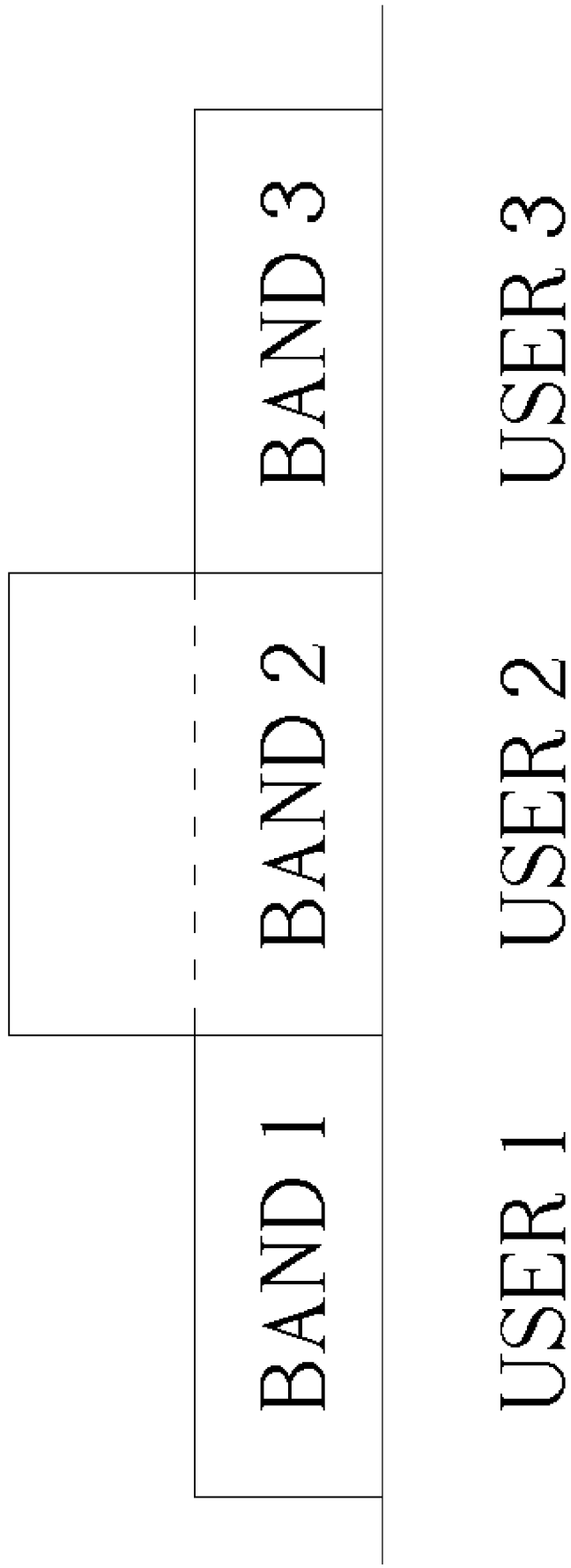
FIG. 8 is a schematic diagram of frequency band use in the WLAN of FIG. 7.

The present invention communication system 20 can be readily incorporated into a WLAN 80 as shown in FIG. 7. The WLAN 80 includes an access point 82 having four antennas and related transmitter and receiver module (see FIG. 4), and first, second, and third user terminals 84, 86, 88 each having corresponding transmitter and receiver module. However, in contrast to the conventional WLAN 10 of FIG. 1, a limited number of frequency bands (three, in FIG. 8) does not result in a corresponding limit in data transfer rate. The second user terminal 86 communicates with the access point 82, through a system such as that of FIG. 4 having two transmitter and receiver antennas using a single frequency band. That is, two antennas of the access point 82 and the corresponding two antennas of the second user terminal 86 are able to share the same frequency band as the access point 82 and second user terminal 86 employ the channel compensation module 60 and channel estimation module 62 of the present invention. By sharing a single frequency band, another frequency band becomes available for the third user terminal 88. FIG. 8 illustrates the frequency band assignments of the present invention WLAN 80. The second user terminal 86 effectively achieves the same data rate as if it were utilizing two separate frequency bands (as in prior art FIG. 2).

Generally, increasing the number of antennas for each frequency band increases the total available data transfer rate. The present invention is not limited by the number of frequency bands available, and if higher transfer rates are required, more antennas are used. An access point according to the present invention can employ any number of antennas and supporting hardware for switching the active frequency bands of the antennas so as to communicate in a flexible way with clients having numerous and varied antenna configurations. For example, an access point having eight antennas could communicate with two clients, each having four antennas, using only two frequency bands. The resulting data transfer rate for each client would be equivalent to that when using four distinct frequency bands per client. In a changing WLAN environment, the same access point could support one to eight clients, the transfer rate of each client being limited primarily its number of antennas. Of course, if necessary, an access point implementing the present invention could also assign more that one frequency band to a given client as in the prior art. The present invention, thus, eliminates the data transfer bottleneck caused by a limited number of frequency bands.

Figure 9:
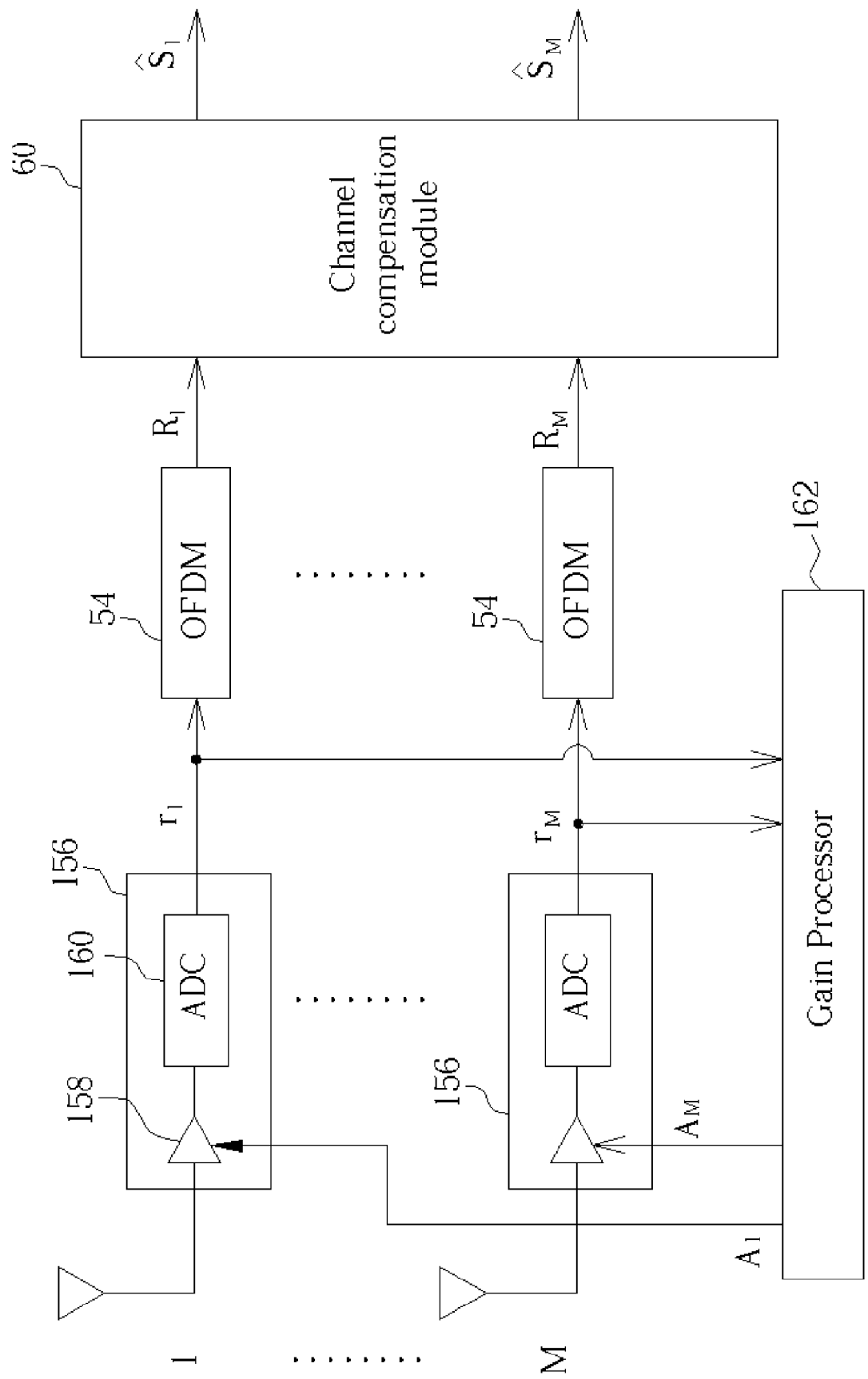
FIG. 9 is a block diagram of a receiver capable of automatic gain control according to the present invention.

Automatic Gain Control:

Please refer to FIG. 9 illustrating an automatic gain control (AGC) structure of a receiver 100 according to the present invention. FIG. 9 depicts structure of FIG. 5 that relates to automatic gain control, and other previously described components such as the channel estimation module 62 have been omitted only for concise explanation. In FIG. 9, AGC-capable receiver RF module 156 replaces the previously described receiver RF module 56, and a gain processor 162 is further provided. Each receiver RF 156 includes an amplifier 158 and an analog-to-digital converter (ADC) 160. The gain processor 162 receives the digital output of each ADC 160 and determines a suitable gain $A_\beta$ to apply to the amplifier 158 in the $\beta$th receiver RF module. The structure and operation of the gain processor 162 is described in the following.

Referring back to equation (2), the received signal at a receiver antenna $\beta$ can be described in the time domain as:

$$r_\beta(n) = \sum_{\alpha=1}^{M} s_\alpha(n) * h_{\beta\alpha}(n) + n_\beta(n) = s_{SHORT}(n) * \sum_{\alpha=1}^{M} h_{\beta\alpha}(n) + n_\beta(n), \quad (12)$$

where $\beta$ is the receiver antenna number, 1~M, $r_\beta$ is the received signal at the receiver antenna $\beta$ in the time domain, n is an index of an OFDM symbol, $\alpha$ is the transmitter antenna number, 1~M, $s_\alpha$ is the transmitted signal at the transmitter antenna $\alpha$ in the time domain, $h_{\beta\alpha}$ is a channel impulse response from the transmitter antenna $\alpha$ to the receiver antenna $\beta$, see equation (1), $n_\beta$ is noise affecting at the receiver $\beta$, and $s_{SHORT}$ is a short preamble symbol.

When performing AGC according to the present invention, known short preamble symbols are used as the transmitted signal, this corresponding to the right side of equation (12). When such known short preamble symbols are used, the receiver 100 can accurately determine root-mean-square (RMS) powers of the received signals.

A received signal RMS power $F_\beta$ is determined for the short preamble symbols for each receiver antenna $\beta$ according to:

$$F_\beta = \sqrt{\sum_{n=1}^{L} r_\beta(n) \cdot r'_\beta(n)/L}, \beta = 1 \sim M, \quad (13)$$

where,

L is the total number of short preamble symbols considered, and * indicates the complex conjugate operation.

Figure 10:
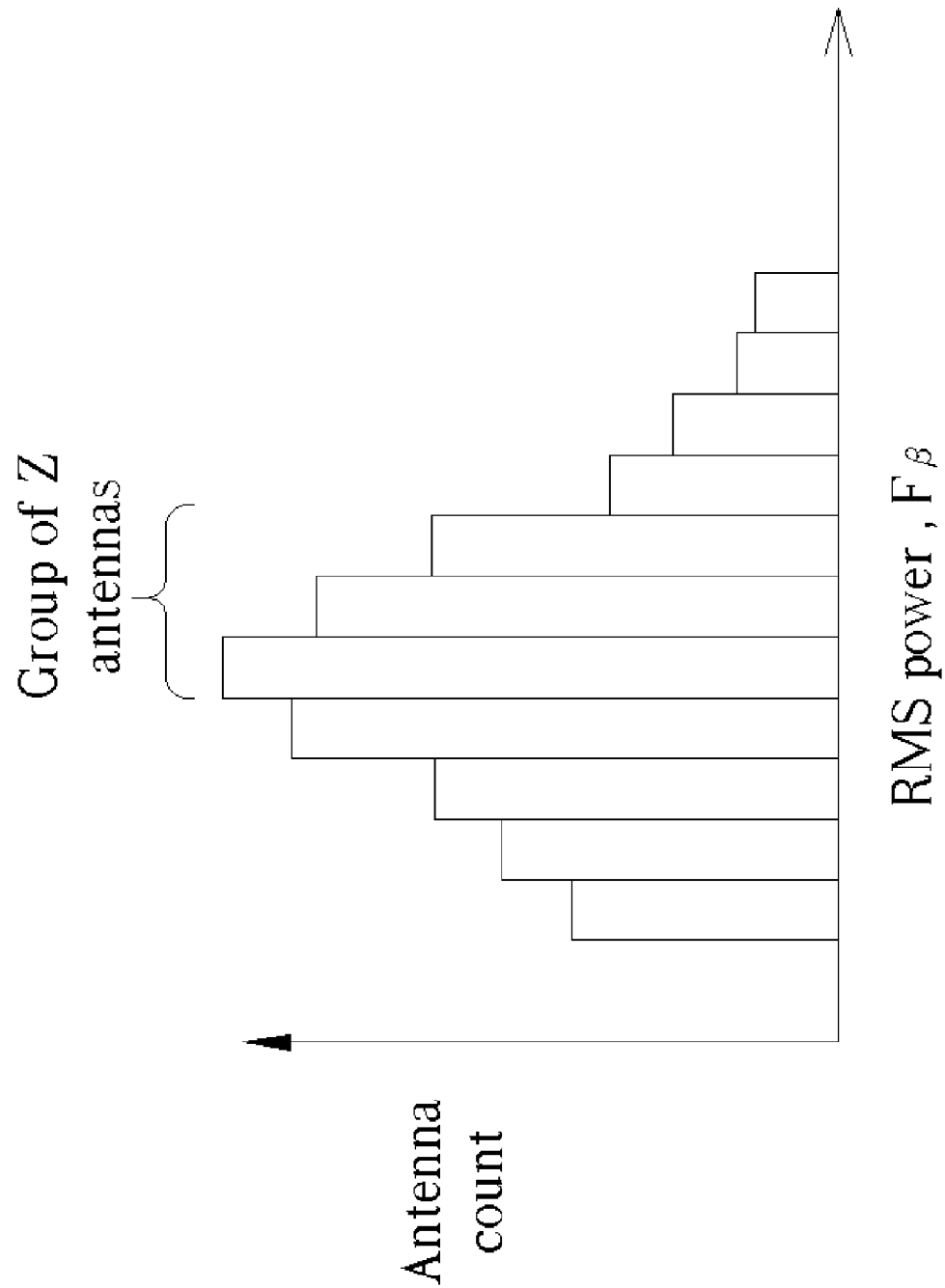
FIG. 10 is a plot of antenna count for RMS powers of the receiver of FIG. 9.

FIG. 10 illustrates a plot of antenna count versus determined RMS power from equation (13), in which the vertical bars represent the amount of antennas having substantially the same RMS power. That is, the total number of antennas in all bars is the total number of antennas in the receiver 100. FIG. 10 also shows an arbitrary group of Z selected antennas that will be discussed further.

The received signal RMS powers $F_\beta$ can be combined in the following three ways for a predetermined set of Z antennas to determine three candidate powers:

$$F_1 = \sqrt{\sum_{\beta=1}^{Z} F_\beta^2/Z}, \text{ which is a further } RMS \text{ calculation,} \quad (14)$$

, which is an arithmetical mean, (15)

, which is a geometric mean. (16)

Then, a single candidate power is selected to determine the gain $A_\beta$ for the amplifiers 158, which is determined by:

$$A_\beta = F_0 / \overline{F}_S, \beta = 1 \sim M, \quad (17)$$

where $F_0$ is a target power, and $\overline{F}_S$ is the selected candidate power, S=1, 2 or 3.

Figure 11:
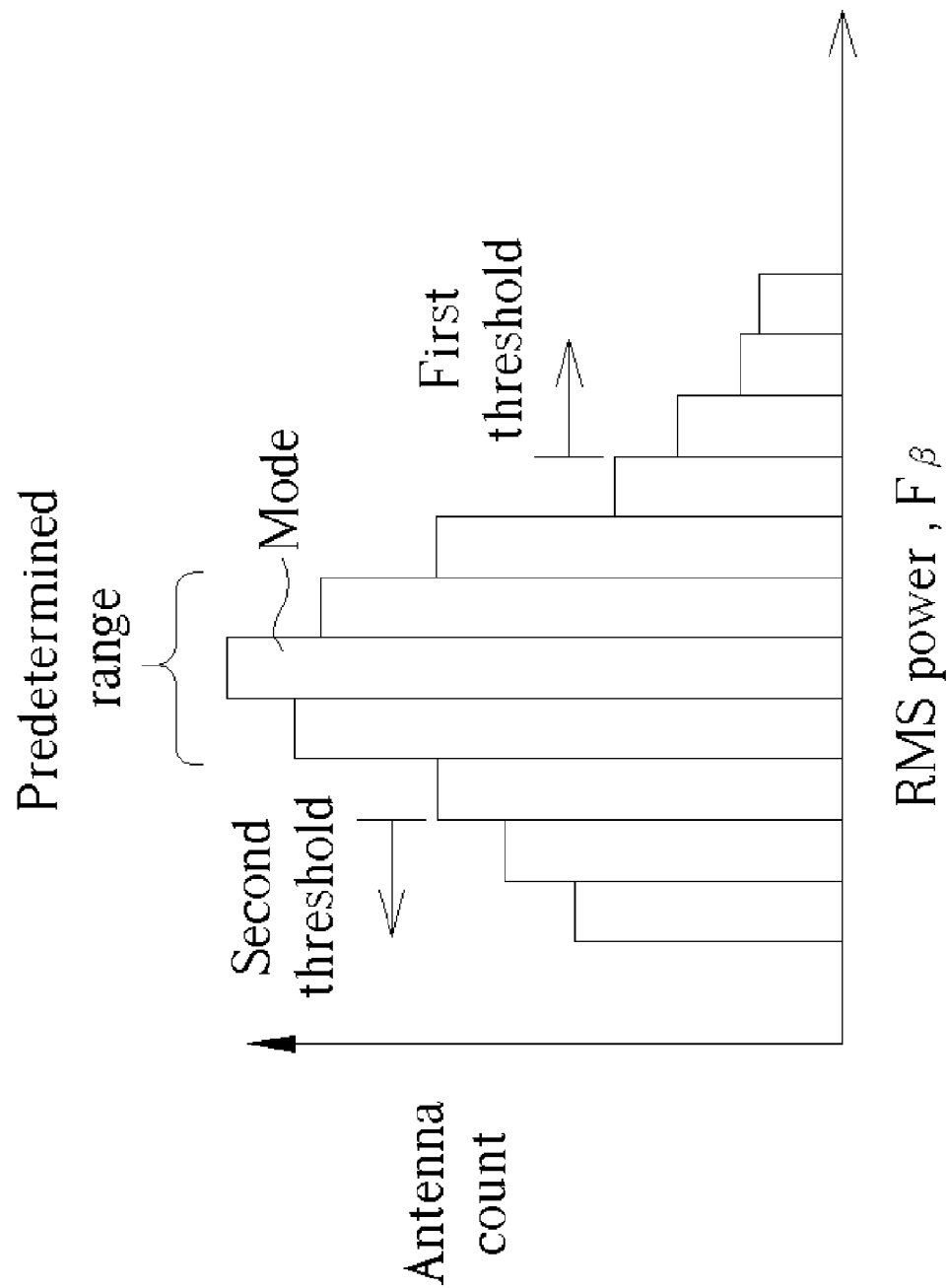
FIG. 11 is another plot of antenna count for RMS powers of the receiver of FIG. 9.

Referring to FIG. 11, the set of Z antennas can be selected according to four groups: all M receiver antennas, receiver antennas having an RMS power (13) above a first threshold, receiver antennas having an RMS power (13) below a second threshold, or receiver antennas having an RMS power within a predetermined range spanning the mode (most common RMS power) of the RMS powers.

Overall there are twelve combinations of three candidate powers (14), (15), (16) and the four possible groups of antennas. Selecting which the three candidate powers (14), (15), (16) are to be calculated and for which groups of antennas depends on the specific application and can be determined by one skilled in the art at the time of implementation. Selecting which combination of the implemented combinations is to be used to set the gain of the amplifiers 158 is according to a predetermined selection rule, such as selecting the maximum value.

Figure 12:
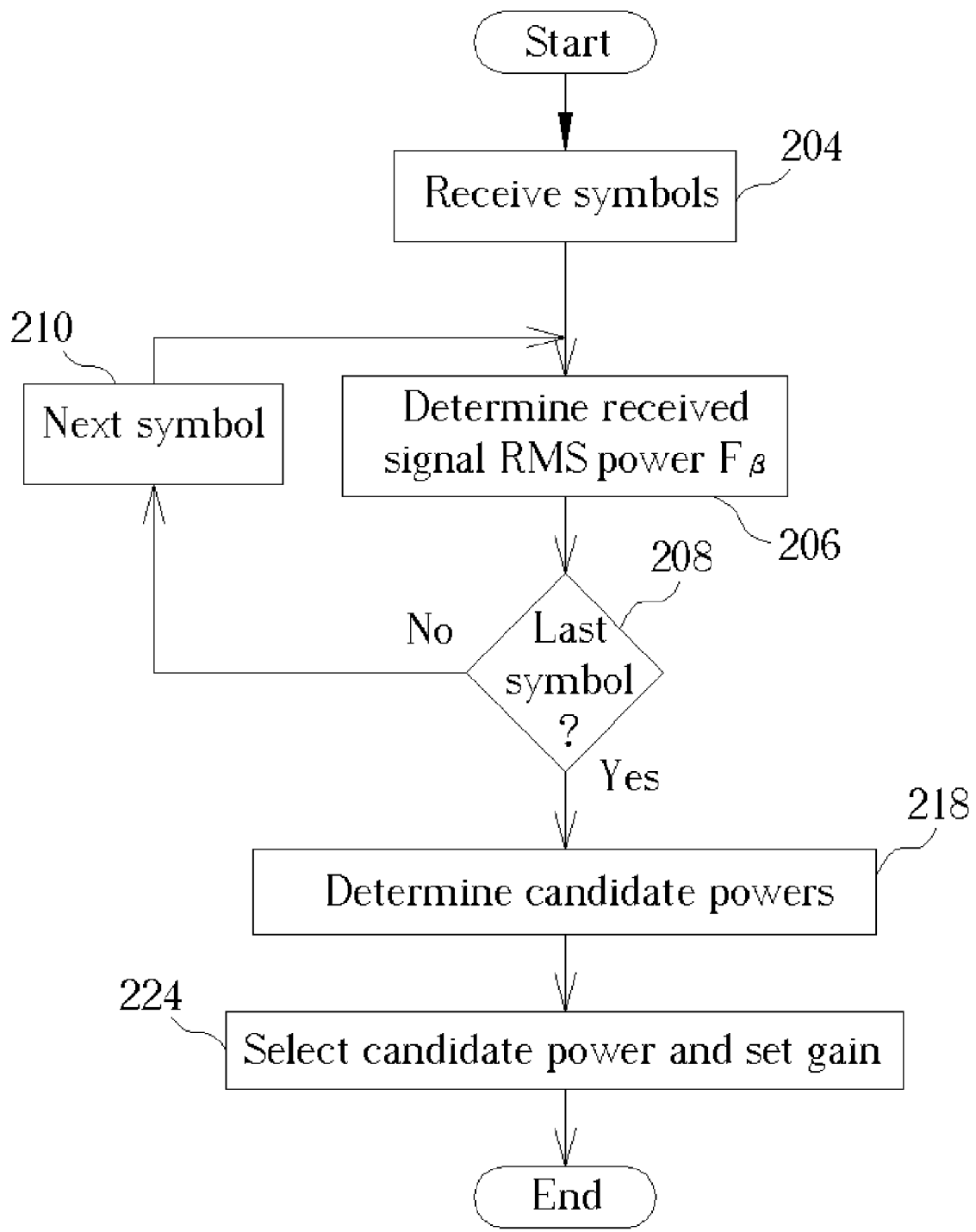
FIG. 12 is a flowchart of an automatic gain control method of the gain processor of FIG. 9.

FIG. 12 illustrates a flowchart 200 of an exemplary method of performing automatic gain control according to the above. For each receiver antenna, short preamble symbols are received in step 204 and are cycled through in steps 208 and 210, and an RMS power is totaled in step 206. This realizes equation (13) for all antennas and determines all information necessary for the plots of FIG. 10 and FIG. 11. Candidate powers according to any of equations (14), (15), and (16) are determined in step 218. Once all candidate powers have been determined, step 224 selects the candidate power according to the predetermined selection rule and then sets the gain of the amplifiers 158 accordingly referencing the target power by (17). The process illustrated by the flowchart 200 is implemented in the gain processor 162.

Naturally, the above method and formulas can be implemented in the gain processor 162 in another well-known manner, such as with electronically tabulated data or algorithm. Preferably, several candidate powers, if not all, are determined. Furthermore, the short preamble need not be used if another suitable substitute signal is available.

In contrast to the prior art, the present invention method allows automatic gain control for multiple OFDM modules receiving data on a single frequency band. A gain processor is provided for measuring RMS powers of short preamble symbols, determining candidate powers, and setting the gain of the receiver amplifiers. Thus, efficient and robust automatic gain control is realized in a multiple OFDM module receiver.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for automatic gain control (AGC) in a receiver of a multiple-antenna system comprising a plurality of modules having a plurality of receiver antennas for substantially simultaneously receiving a plurality of signals via a single frequency band, the method comprising:

amplifying the plurality of received signals with at least an amplifier;

generating a plurality of time domain samples of the amplified signals with at least an analog-to-digital converter (ADC) connected to the amplifier;

determining at least a candidate power according to root-mean-square (RMS) powers of a group of symbols received at the receiver antennas with a processor connected to the ADC; and setting the gain of the amplifier according to a selected candidate power with the processor;

wherein the received RMS power for one antenna is determined as the square root of the averaged product of each received symbol and its complex conjugate for all symbols of the group.

2. The method of claim 1 wherein the candidate power is an RMS value of the RMS powers for each antenna determined for a first group of antennas.

3. The method of claim 2 wherein the first group is all receiver antennas.

4. The method of claim 2 wherein the first group is receiver antennas having RMS powers larger than a first threshold.

5. The method of claim 2 wherein the first group is receiver antennas having RMS powers smaller than a second threshold.

6. The method of claim 2 wherein the first group is receiver antennas having RMS powers within a predetermined range spanning a mode of RMS powers of all antennas.

7. The method of claim 1 wherein the candidate power is an arithmetical mean of the RMS powers for each antenna determined for a second group of antennas.

8. The method of claim 7 wherein the second group is all receiver antennas.

9. The method of claim 7 wherein the second group is receiver antennas having RIMS powers larger than a first threshold.

10. The method of claim 7 wherein the second group is receiver antennas having RMS powers smaller than a second threshold.

11. The method of claim 7 wherein the second group is receiver antennas having RMS powers within a predetermined range spanning a mode of RMS powers of all antennas.

12. The method of claim 1 wherein the candidate power is a geometric mean of the RMS powers for each antenna determined for a third group of antennas.

13. The method of claim 12 wherein the third group is all receiver antennas.

14. The method of claim 12 wherein the third group is receiver antennas having RMS powers larger than a first threshold.

15. The method of claim 12 wherein the third group is receiver antennas having RMS powers smaller than a second threshold.

16. The method of claim 12 wherein the third group is receiver antennas having RMS powers within a predetermined range spanning a mode of RMS powers of all antennas.

17. The method of claim 1 wherein the set gain is a target power divided by the candidate power.

18. The method of claim 1 wherein the symbols are IEEE 802.11a or 802.11g short preamble symbols of the received signals.

19. A method for automatic gain control (AGC) in a receiver of a multiple-antenna system, the method comprising:

receiving a first signal by a first antenna;

receiving a second signal by a second antenna;

amplifying the received first signal to generate a first amplified signal with a first amplifier;

amplifying the received second signal to generate a second amplified signal with a second amplifier;
generating a first plurality of time domain samples of the first amplified signals;
generating a second plurality of time domain samples of the second amplified signals;
determining a first candidate power according a first group of symbols received at the first antenna;
determining a second candidate power according to a second group of symbols received at the second antenna;
selecting one selected candidate power out of the first candidate power and the second candidate power according to a predetermined rule; and
setting a gain of the first and second amplifiers according to the selected candidate power;
wherein the first and second candidate powers are determined according to root-mean-square (RMS) powers of the first and second group of symbols respectively, and each RMS power is determined as the square root of the averaged product of each received symbol and its complex conjugate for all symbols of each group.

20. The method of claim 19 wherein the each candidate power is an RMS value of the RMS powers for the first and the second antennas.

21. The method of claim 19 wherein the candidate power is an arithmetical mean of the RMS powers for the first and the second antennas.

22. The method of claim 19 wherein the candidate power is a geometric mean of the RMS powers for the first and the second antennas.

23. The method of claim 19 wherein the set gain is a target power divided by the candidate power.

24. The method of claim 19 wherein the symbols are IEEE 302.11a or 802.11g short preamble symbols of the received signals.

25. The method of claim 19 further comprising:
receiving a third signal by a third antenna;
amplifying the received third signal to generate a third amplified signal with a third amplifier;
generating a third plurality of time domain samples of the third amplified signals;
determining a third candidate power according a third group of symbols received at the third antenna;
selecting one selected candidate power out of the first candidate power, the second candidate power, and the third candidate power according to the predetermined rule; and
setting the gain of the first, the second, and the third amplifiers according to the selected candidate power.

26. The method of claim 25, wherein the first, the second, and the third candidate powers are determined according to root-mean-square (RMS) powers of the first, the second, and the third group of symbols respectively, and the each RMS power is determined as the square root of the averaged product of each received symbol and its complex conjugate for all symbols of the each group.

* * * * *